(12) United States Patent
Menchero et al.

(10) Patent No.: US 8,756,140 B1
(45) Date of Patent: Jun. 17, 2014

(54) COMPUTER-IMPLEMENTED SYSTEMS AND METHODS FOR MODELING RISK OF AN INVESTMENT PORTFOLIO

(75) Inventors: Jose Menchero, San Francisco, CA (US); Doyle J. Orr, Richmond, CA (US)

(73) Assignee: MSCI Inc., New York, NY (US)

( * ) Notice: Subject to any disclaimer, the term of this patent is extended or adjusted under 35 U.S.C. 154(b) by 157 days.

(21) Appl. No.: 13/298,981

(22) Filed: Nov. 17, 2011

Related U.S. Application Data

(60) Provisional application No. 61/561,003, filed on Nov. 17, 2011, provisional application No. 61/416,422, filed on Nov. 23, 2010.

(51) Int. Cl.
*G06Q 40/00* (2012.01)

(52) U.S. Cl.
USPC .............................. 705/36 R; 705/1.1; 705/35

(58) Field of Classification Search
USPC .................................................... 705/1.1, 35
See application file for complete search history.

(56) References Cited

U.S. PATENT DOCUMENTS

| | | | |
|---|---|---|---|
| 7,016,873 B1* | 3/2006 | Peterson et al. ............ | 705/36 R |
| 7,328,182 B1* | 2/2008 | Yahil et al. .................. | 705/36 R |
| 7,890,408 B2* | 2/2011 | Menchero et al. ........... | 705/36 R |
| 2002/0002521 A1* | 1/2002 | Shearer et al. .................. | 705/36 |
| 2002/0091605 A1* | 7/2002 | Labe et al. ........................ | 705/36 |
| 2002/0123953 A1* | 9/2002 | Goldfarb et al. ................. | 705/36 |
| 2003/0110016 A1* | 6/2003 | Stefek et al. ...................... | 703/2 |
| 2004/0078319 A1* | 4/2004 | Madhavan et al. .............. | 705/38 |
| 2004/0148246 A1* | 7/2004 | Uysal ............................... | 705/37 |
| 2010/0153307 A1* | 6/2010 | Stubbs et al. ............... | 705/36 R |
| 2012/0076248 A1* | 3/2012 | Rosenqvist ................... | 375/346 |

OTHER PUBLICATIONS

Axioma Research Paper No. Research Paper No. 015 Feb. 12, 2010.*
Factored Sparse Inverse Covariance Matrices Jeff A. Bilmes IEEE International Conference on Acoustics, Speech, and Signal Processing, Istanbul, 2000.*
MSCI Applied Research, "Identifying Sources of Correlation in Global Equity Portfolios", Sep. 2010 (7 pages).
Menchero, et al., MSCI Research, "Decomposing Cross-Sectional Volatility",Sep. 2010 (21 pages).
Menchero, et al., MSCI Barra Research, "The Barra Global Model (GEM2)", Sep. 2008 (79 pages).
Menchero, et al., MSCI Barra Research, "The Barra Europe Equity Model (EUE3)", Jun. 2009 (69 pages).
Menchero, et al., MSCI Research Insight, "Eigen-Adjusted Covariance Matrices". May 2011 (21 pages).
Menchero, et al., MSCI Model Insight, The Barra US Equity Model (USE4), Methodology Notes, Aug. 2011 (44 paeges).
Menchero, et al., MSCI Model Insight, The Barra US Equity Model (USE4), Empirical Notes, Sep. 2011 (60 pages).

(Continued)

*Primary Examiner* — William Rankins
(74) *Attorney, Agent, or Firm* — K&L Gates LLP

(57) ABSTRACT

Computer-based systems and methods are disclosed that generally relate to risk modeling for investment portfolios, such as equity investment portfolios. For example, a factor covariance matrix for a particular investment portfolio can be adjusted for known biases, including non-stationarity bias and optimization bias. In addition, new techniques for computing specific volatilities and relative specific volatilities for assets in a particular investment portfolio are disclosed.

13 Claims, 3 Drawing Sheets

(56) References Cited

OTHER PUBLICATIONS

Menchero, Jose et al., "Improving Risk Forecasts for Optimized Portfolios." Finanical Analysts Journal, vol. 68, No. 3, pp. 40-50 (2012).
Menchero, et al., MSCI Research, "Decomposing Cross-Sectional Volatility", Sep. 2010 (21 pages).
Menchero, et al., MSCI Barra Research, "The Barra Global Equity Model (GEM2)", Sep. 2008 (79 pages).
Menchero, et al., MSCI Research Insight, "Eigen-Adjusted Covariance Matrices", May 2011 (21 pages).
Menchero, et al., MSCI Model Insight, The Barra US Equity Model (USE4), Methodology Notes, Aug. 2011 (44 pages).

* cited by examiner

COMPUTER-IMPLEMENTED SYSTEMS AND METHODS FOR MODELING RISK OF AN INVESTMENT PORTFOLIO

PRIORITY

This application claims the benefit of U.S. Provisional Application Ser. No. 61/416,422, filed on Nov. 23, 2010 and incorporated herein by reference in its entirety. This application also claims the benefit of U.S. Provisional Application Ser. No. 61/561,003, filed on even date herewith and also incorporated herein by reference in its entirety.

BACKGROUND

Many managers of investment portfolios employ risk modeling as a management technique. In order to determine the risk of a portfolio, consideration may be given to: (1) the holdings of the portfolio; (2) a factor exposure matrix; (3) a factor covariance matrix; (4) the specific volatility of each stock in the portfolio. The factors may include, for example, style factors, industry factors, and/or country factors. The factor covariance matrix may include undesirable biases that are incorporated into the data that it presents.

SUMMARY

Generally, the present invention is related to risk modeling for investment portfolios, such as equity investment portfolios. For example, various embodiments are directed to computer-based systems and methods for adjusting covariance matrices used to model the risk, or volatility, of an investment portfolio. The covariance matrix may be a factor covariance matrix, where the factors are used to model the risk of the portfolio. Such factor covariance matrices may exhibit biases, including non-stationarity bias and/or optimization bias. In various embodiments of the present invention, the factor covariance matrix for a portfolio is adjusted for one or both of these biases. Such adjustment can result in more reliable risk forecasts for a portfolio because the biases are accounted for.

In one general aspect, the present invention is directed to computer-based systems and methods for adjusting a factor covariance matrix by a cross-sectional adjustment parameter, wherein the adjusted factor covariance matrix is used to compute a risk for an investment portfolio.

In one general aspect, the present invention is directed to computer-based systems and methods for adjusting a factor covariance matrix by a set of spectral adjustment parameters to generate an adjusted factor covariance matrix, wherein the adjusted factor covariance matrix is used to compute a risk for an investment portfolio.

FIGURES

Various embodiments of the present invention are described herein by way of example in conjunction with the following figures wherein.

DESCRIPTION

Figure 1:
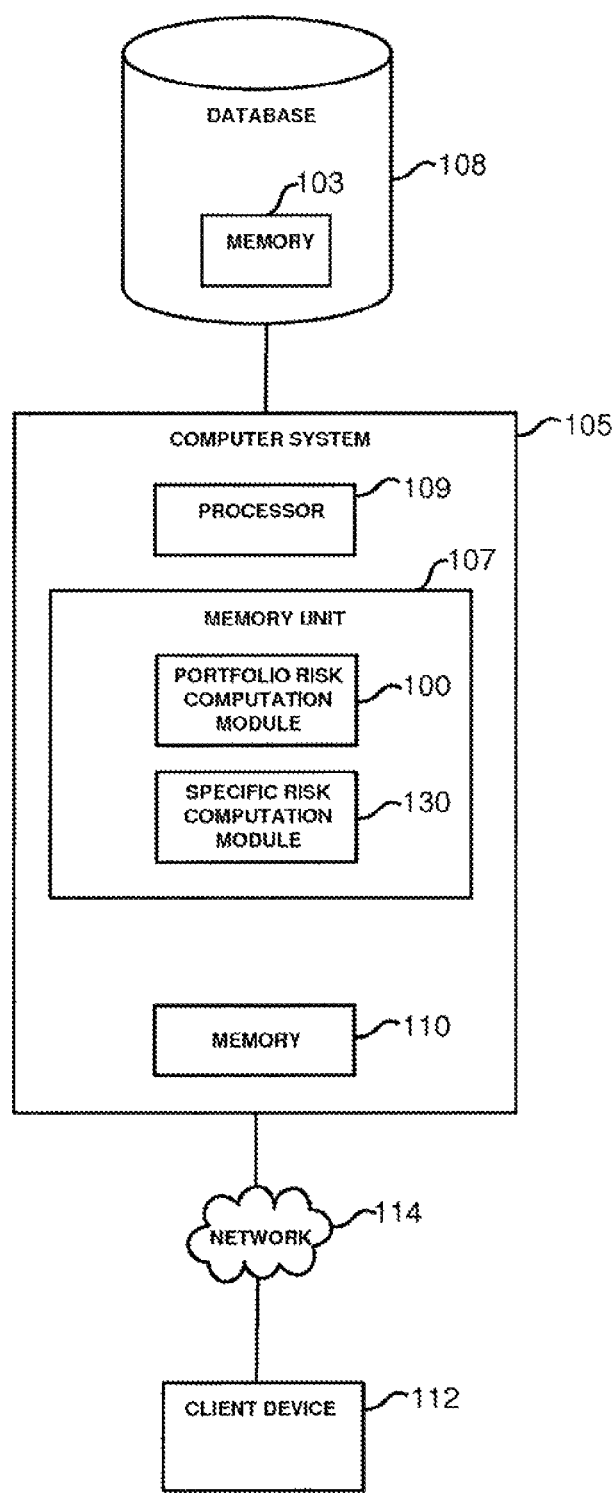
FIG. 1 illustrates a computer system in accordance with one non-limiting embodiment.

In finance, a portfolio is an appropriate mix or collection of investments, such as stocks or other securities, held by an institution or an individual. The use of factor models for forecasting the risk of a portfolio is known, such as described in Jose Menchero, Andrei Morozov, and Peter Shepard, *The Barra Global Equity Model (GEM2), Research Notes*, MSCI Barra Model Insights, September 2008, (herein referred to as "GEM2 Research Notes"), the entirety of which is incorporated by reference. Additional factor models are described in Beat G. Briner, Rachael C. Smith, and Paul Ward, *The Barra Europe Equity Model (EUE3), Research Notes*, MSCI Barra Model Insights, June 2009, (herein referred to as "EUE3 Research Notes"), the entirety of which is also incorporated by reference. Both GEM2 Research Notes and EUE3 Research Notes were included as exhibits in U.S. Provisional Application Ser. No. 61/416,422. The factors used for modeling the risk of a portfolio may include, for example, industry factors, style factors, and/or country factors. Examples of factors are provided in GEM2 Research Notes.

The risk, or volatility, of a portfolio P can be obtained using a factor model approach by:

$$\sigma(R_P) = \left[ \sum_{kl} X_k^P F_{kl} X_l^P + \sum_n (h_n^P)^2 \Delta_n \right]^{1/2} \quad (1)$$

where $R_P$ is the portfolio excess return, $X_k^P$ is the portfolio exposure to factor k, $F_{kl}$ is the $kl^{th}$ element of the factor covariance matrix (FCM), where $F_{kl} = \text{cov}(f_k, f_l)$ where $f_k$ is the factor return for factor k, $h_n^P$ is the portfolio weight of asset n, where $$X_k^P = \sum_n h_n^P X_{nk}$$

(where $X_{nk}$ is the exposure of stock n to factor k), and $\Delta_n$ is the variance of specific returns.

The risk, or volatility, of a portfolio P in such a factor model is dependent on the FCM $F_{kl}$. In some embodiments equation (1), or variations thereof, also may be used to model global portfolios which include country factors. For a global portfolio, the factor covariance matrix may be segmented into various blocks, such as a style/industry block, a country block, and a currency block, with a cross-sectional volatility adjustment (as discussed in more detail below) computed for each block.

The FCM for a particular portfolio may include two known biases: (1) non-stationarity bias and (2) optimization bias. Various aspects of the present embodiments are generally directed to computer-based systems and methods for adjusting the factor covariance matrix for one or both of these biases so that the risk for the portfolio can be more reliably obtained. Through the adjustments, the biases associated with the factor covariance matrix for a particular portfolio may be reduced or eliminated.

Non-stationarity bias generally results from volatility changing over time. If volatility is trending downward, volatility forecasts, which traditionally give more weight to recent data, will tend to be too high. Some time-series based techniques for volatility forecasts include using exponentially weighted moving averages (EWMA) to give more weight to recent observations. This technique, however, may underestimate risk if volatilities are increasing while overpredicting risk if volatilities are going down. Thus, unwanted bias may be introduced into the factor covariance matrix via time-series EWMA. The presently disclosed systems and methods utilize cross-sectional observations to reduce this non-stationarity bias by adjusting the factor covariance matrix by a cross-sectional adjustment parameter.

Optimization strategies for investment portfolios strive to construct a portfolio which has minimum risk for a given level of return by choosing the holdings and relative proportions of those holdings. Optimization may also include, for a given amount of risk, selecting a portfolio with the highest possible return. Optimization bias generally results from optimizers basing decisions on spurious correlations between factors that lead to overly optimistic volatility forecasts. The optimization process typically exaggerates the effect of factors that historically hedge each other. The out-of-sample volatility of optimized portfolios tends to be higher than the predicted volatility. The presently disclosed systems and methods reduce, and sometimes eliminate, this optimization bias by adjusting the factor covariance matrix by a set of spectral adjustment parameters.

The factor covariance matrix may be adjusted using any suitable technique to adjust for bias. In one embodiment, a cross-sectional volatility adjustment is utilized. This implementation generally uses cross-sectional data to provide a more responsive risk forecast and reduce or eliminate bias, such as non-stationarity bias. In one embodiment, a spectral adjustment is utilized. As discussed in more detail below, the spectral adjustment may adjust the eigenvalues of the factor covariance matrix to reduce or eliminate bias of an optimized portfolio.

The unadjusted factor covariance matrix may be calculated using any suitable manner, such as similar to the methodologies outlined in GEM2 Research Notes. In one embodiment, the factor covariance matrix is built from a time series of periodic (e.g., weekly) factor returns. Exponentially weighted moving averages may be used to estimate the factor covariance matrix. In other embodiments, generalized autoregressive conditional heteroskedasticity may be utilized. In the discussion thus far, the covariance matrices were described in the context of factor covariance matrices, although it should be recognized that the covariance matrix may be based on stocks or factors. Accordingly, the systems and methods disclosed herein are intended to cover both implementations. For clarity and simplicity, however, this disclosure will typically only refer to factors and FCMs, which is not intended to limit the scope of the disclosure.

According to various embodiments, the present disclosure is directed to systems and methods for adjusting a covariance matrix (e.g., a FCM) in order to improve the accuracy and responsiveness of equity risk models (e.g., for portfolios comprising equities). As shown in FIG. 1, one embodiment of the present disclosure may comprise a computer system 105 that adjusts factor covariance matrices per the embodiments of the present invention and computes the risk for the portfolio using the adjusted FCMs. The computer system 105 may be any suitable processor-based device or system, such as a personal computer, laptop, server, mainframe, or a collection (e.g., network) of multiple computers, for example. The computer system 105 may comprise one or more processors 109 and one or more computer memory units 107. For convenience, only one processor 109 and only one memory 107 are shown in FIG. 1. The processor 109 may execute software instructions stored on the memory unit 107. The processor 109 may be implemented as an integrated circuit (IC) having one or multiple cores. The memory 107 may comprise volatile and/or non-volatile memory units. Volatile memory units may comprise random access memory (RAM), for example. Non-volatile memory units may comprise read only memory (ROM), for example, as well as mechanical non-volatile memory systems, such as, for example, a hard disk drive, an optical disk drive, etc. The RAM and/or ROM memory units may be implemented as discrete memory ICs, for example.

The memory unit 107 may comprise a portfolio risk computation module 100. When the processor 109 of the computer system 105 executes the software of the portfolio risk computation module 100, the processor 109 may be caused to compute the adjusted FCM and portfolio risk for a portfolio per the embodiments described herein. Data for computing the adjusted FCM and portfolio risk may be from various sources, such as an electronic computer database 108, for example. The data stored in the database 108 may be stored in a non-volatile computer memory 103, such as a hard disk drive, a read only memory (e.g., a ROM IC), or other types of non-volatile memory. Also, the data of the database 108 may be stored on a remote electronic computer system, for example. The memory unit 107 may comprise a specific risk computation module 130. When the processor 109 of the computer system 105 executes the software of the specific risk computation module 130, the processor 109 may be caused to compute a specific volatility forecast in accordance with the present disclosure. Data for computing the specific volatility forecast may be from various sources, such as an electronic computer database 108, for example.

The adjusted factor covariance matrix that is computed by the computer system 105 may be stored in a memory or computer file associated with the computer system 105. For example, the adjusted factor covariance matrix may be stored in computer memory 110. The computer memory 110 may comprise volatile and/or non-volatile memory units. Volatile memory units may comprise random access memory (RAM), for example. Non-volatile memory units may comprise read only memory (ROM), for example, as well as mechanical non-volatile memory systems, such as, for example, a hard disk drive, an optical disk drive, etc. In addition, the calculated adjusted factor covariance matrix and/or other portfolio related information may be transmitted in a file via a computer to a remote computer device or system. The computer system 105 may transfer the calculated index, such as in a file, to another computer system via ah electronic data communication network, such as a LAN or WAN (not shown).

In various embodiments, using a client device 112, a client may communicate with the computer system 105 through a network 114. For example, in one embodiment, the client may transmit the data regarding a portfolio to the computer system 105 from the client device 112 via the network 114, such as by FTP or some other suitable data communication protocol. Also, the computer system 105 may transmit the results of the risk modeling process, described further below, to the client device 112 via the network 114. The client device 112 may be any network-enabled device, such as a personal computer, a server, a laptop, a personal data assistant (PDA), a wireless e-mail device, a smart phone, or any other programmable device or appliance configured to communicate with the network 114. The network 114 may include a suitable communications network, such as LAN, WAN, MAN, the Internet, etc., having wired and/or wireless links. Furthermore, the risk models, and any other computations, generated by the computer system 105 may be delivered to the client device 112 in any suitable format. In one embodiment, for example, the client device 112 may execute a software application that displays data associated with the risk model. In another embodiment, the risk model may be delivered via a flat file. In another embodiment, the risk model may be accessible to a client via a web-hosted application. The present disclosure is not limited to any particular risk model delivery technique.

Referring now to the cross-sectional volatility (CSV) adjustment, this adjustment generally examines the time series volatility of each factor (or stock) and also the cross-sectional data for each time period to improve the estimate of the factor covariance matrix. Assuming that F is a current factor covariance matrix (i.e., based on today's values), with elements $F_{km}$, the volatility forecast for factor k is $\sigma_k$=SQRT $(F_{kk})$, where $F_{kk}$ is a diagonal matrix element. In one embodiment, k represents an individual factor, and K represents the total number of factors in the covariance matrix, such that F is a K by K matrix. The return of factor k over a period t is $f_{kt}$. Generally, a cross-sectional square bias statistic may be the weighted average of the squared return of the individual factors divided by the predicted variance for that factor at the beginning of the period. According to one embodiment, the cross-sectional bias statistic for period t may be determined by equation (2):

$$B_t^2 = \sum_k \omega_{kt} \left(\frac{f_{kt}}{\sigma_{kt}}\right)^2 \qquad (2)$$

where $\omega_{kt}$ is the weight given to a factor k at period t and $\sigma_{kt}$ is the volatility forecast at the start of period t. The weight $\omega_{kt}$ may be chosen to be equally weighted, or a non-equal weighting scheme may be used. The ratio of the squared return of factor k to the variance forecast of the start of period t will theoretically be 1 if the risk forecast is accurate, subject to sampling error. Therefore, the cross-sectional bias statistic gives an instantaneous measure of the accuracy of the risk forecast. As is to be appreciated, equation (2), as well as numerous other equations in this disclosure may be modified or varied without departing from the scope of the present disclosure. For example, in some embodiments, equation (2) could be demeaned without departing from the scope of the present disclosure. All such variations are intended to be covered by this disclosure.

Equation (2.1) provides an example of one way that equation (2) may be demeaned:

$$B_t^2 = \sum_k \omega_{kt}(Z_{kt} - \bar{Z}_t)^2 \qquad (2.1)$$

In equation (2.1), $Z_{kt}$ is equal to the quantity $$\frac{f_{kt}}{\sigma_{kt}},$$

and $\bar{Z}_t$ is the mean of $$\frac{f_{kt}}{\sigma_{kt}}.$$

In one embodiment, the exponentially weighted moving average (EWMA) of cross-sectional squared bias statistic may be determined by equation (3):

$$B^2 = \sum_t \lambda_t B_t^2 \qquad (3)$$

where $\lambda_t$ is the weight giving more weight or emphasis to recent observations. The quantity $B^2$ is generally a measure of how biased the variance forecasts are. For example, if $B^2>1$, risk has been underforecasted and the volatility forecasts need to be scaled up. Comparatively, if $B^2<1$, risk has been over-forecasted and the volatility forecasts need to be scaled down. Additionally, as one variation to equation (3), an EWMA cross-sectional bias statistic may be determined by equation (3.1):

$$B = \sum_t \lambda_t B_t \qquad (3.1)$$

The covariance between a factor k and a factor m may be determined by equation (4):

$$F_{km} = \sigma_k \sigma_m \rho_{km} \qquad (4)$$

where $\sigma_k$ and $\sigma_m$ are the volatility forecasts of factor k and a factor m, respectively, and $\rho_{km}$ is the correlation forecast for the two factors. In Equation (4), $\sigma_k$ and $\sigma_m$ are unadjusted volatility forecasts. The volatility forecasts for all of the factors in F may be adjusted by the same amount, as shown in equation (5):

$$\tilde{\sigma}_k^2 = B^2 \sigma_k^2 \qquad (5)$$

where $\tilde{\sigma}_k^2$ is the "adjusted" variance for factor k and $\sigma_k^2$ is the original variance. Equation (5) provides the cross-sectional volatility (CSV) adjusted variance forecast for factor k. The CSV adjusted variance forecast may be computed, by a computer system 105, for each factor in the factor covariance matrix. Accordingly, the adjusted factor covariance matrix ($\tilde{F}$) may be determined by equation (6) by multiplying every single element of F by $B^2$:

$$\tilde{F} = B^2 F \qquad (6)$$

In various embodiments, the adjusted factor covariance matrix ($\tilde{F}$) may be used in place of the unadjusted factor covariance matrix (F) when assessing the risk of a portfolio. In one embodiment, the adjusted factor covariance matrix ($\tilde{F}$) may replace the unadjusted factor covariance matrix (F) in equation (1) above to determine the volatility of a portfolio.

For embodiments using an F that has been segmented into blocks, each block may have its own bias statistic. For example, if F has matrix elements $F_{km}$, and if factor k belongs to block 1 and factor m belongs to block 2, and assuming that block 1 has an adjustment factor $B_1$ and block 2 has an adjustment factor $B_2$, then $\tilde{F}_{km} = B_1 B_2 F_{km}$. If factor k and factor m each belong to block 1, then $\tilde{F} = (B_1)^2 F_{km}$, and so on.

In summary, according to various embodiments, the factor covariance matrix may be first computed by a computer system in a traditional format, such as by the technique outlined in the GEM2 Research Notes. Next, cross-sectional observations, such as a cross-section bias statistic, are used to adjust all of the volatilities by the same amount (e.g., "$B^2$"). In one embodiment, the correlation among the factors remains unchanged. For example, as shown in equation (7), the correlation forecast ($\rho_{km}$) does not change:

$$\tilde{F}_{km} = \tilde{\sigma}_k \tilde{\sigma}_m \rho_{km} \qquad (7)$$

Instead, just the risk model is being calibrated to give a more timely forecast of current volatility levels.

As provided above, the process of optimizing a portfolio may also introduce bias by exaggerating the effect of factors that historically hedge each other. Typically, the realized volatility of optimized portfolios is greater than the predicted volatility. In accordance with the present disclosure, adjustment may be made to the factor covariance matrix to account for at least some of this bias in order to make the factor covariance matrix more accurate and responsive. In one embodiment, a spectral adjustment may be made to the factor covariance matrix. Letting F be an unadjusted K×K factor covariance matrix, and U be a K×K rotation matrix (e.g., a unitary matrix) that transforms F into the diagonal basis, a diagonal covariance matrix (D) may be defined by equation (8):

$$D = UFU' \qquad (8)$$

where U' denotes the transpose of U. In the diagonal basis, all of the off-diagonal elements are zero. In some embodiments, F may be the factor covariance matrix after a cross-volatility adjustment has been made. In some embodiments, the cross-volatility adjustment may be made after the spectral adjustment or vice versa. In some embodiments, only one or the other adjustment will be made to F. All such implementations are intended to be covered by the present disclosure. The diagonal covariance matrix D may be transformed back into the original basis (e.g., the pure factor basis) using equation (9):

$$F = U'DU \qquad (9)$$

Next, letting $e_k$ be a K×1 vector with zeros in all entries except for a one in the $k^{th}$ element, the variance of the eigenfactor k may be determined by equation (10):

$$(\sigma_k^D)^2 = e'_k D e_k \qquad (10)$$

Generally, eigenfactor k is a linear combination of all pure factor portfolios, as shown in equation (11):

$$d_k = U'e_k \qquad (11)$$

The eigenvariances $(\sigma_k^D)^2$ are biased since they exploit historical covariances that tend not to persist out-of-sample. Just because factors may have been correlated in the past, however, does not ensure that the factors will continue to co-move or otherwise be correlated in the future. Letting $\lambda_k$ be a scalar adjustment to remove this bias, the adjusted volatility of eigenfactor k may be defined by equation (12):

$$\tilde{\sigma}_k^D = \lambda_k \sigma_k^D \qquad (12)$$

Since some eigenfactors may be overforecasted, while other eigenfactors may be underforecasted, $\lambda_k$ will be less than 1 or greater than 1. The diagonal elements of the adjusted factor covariance matrix may be determined by equation (13):

$$\tilde{D}_{kk} = \lambda_k^2 (\sigma_k^D)^2 \qquad (13)$$

In various embodiments, the spectrally adjusted factor covariance matrix may be determined by equation (14):

$$\tilde{F} = U'\tilde{D}U \qquad (14)$$

Therefore, according to one embodiment, the original factor covariance matrix is first diagonalized and then the biases for all of the eigenfactors along the diagonal are estimated. The diagonal elements are adjusted to remove (or at least reduce) the biases. The matrix is then transformed back using equation (14) to generate all of the off-diagonal adjustments.

The scalar adjustment $\lambda_k$ may be determined using any of a variety of acceptable mathematical methods, such as empirically or by simulation, for example. For the empirical method, let $U_t$ be a unitary matrix that diagonalizes the factor covariance matrix F at time t, as shown in equation (15):

$$D_t = U_t F'_t U'_t \qquad (15)$$

As is to be appreciated, equation (15) may be similar to equation (8), but with a temporal component since the factor covariance matrix changes over time. Next, letting $f_t$ be a K×1 vector of pure factor returns for time period t, the return of pure factor k for period t may be determined by equation (16):

$$f_{kt} = f'_t e_k \qquad (16)$$

The return of pure eigenfactor k, period t, may be determined by equation (17):

$$d_{kt} = f'_t U'_t e_k \qquad (17)$$

Therefore, for any factor k and for any period t, the return for the eigenfactor may be determined.

Figure 2:
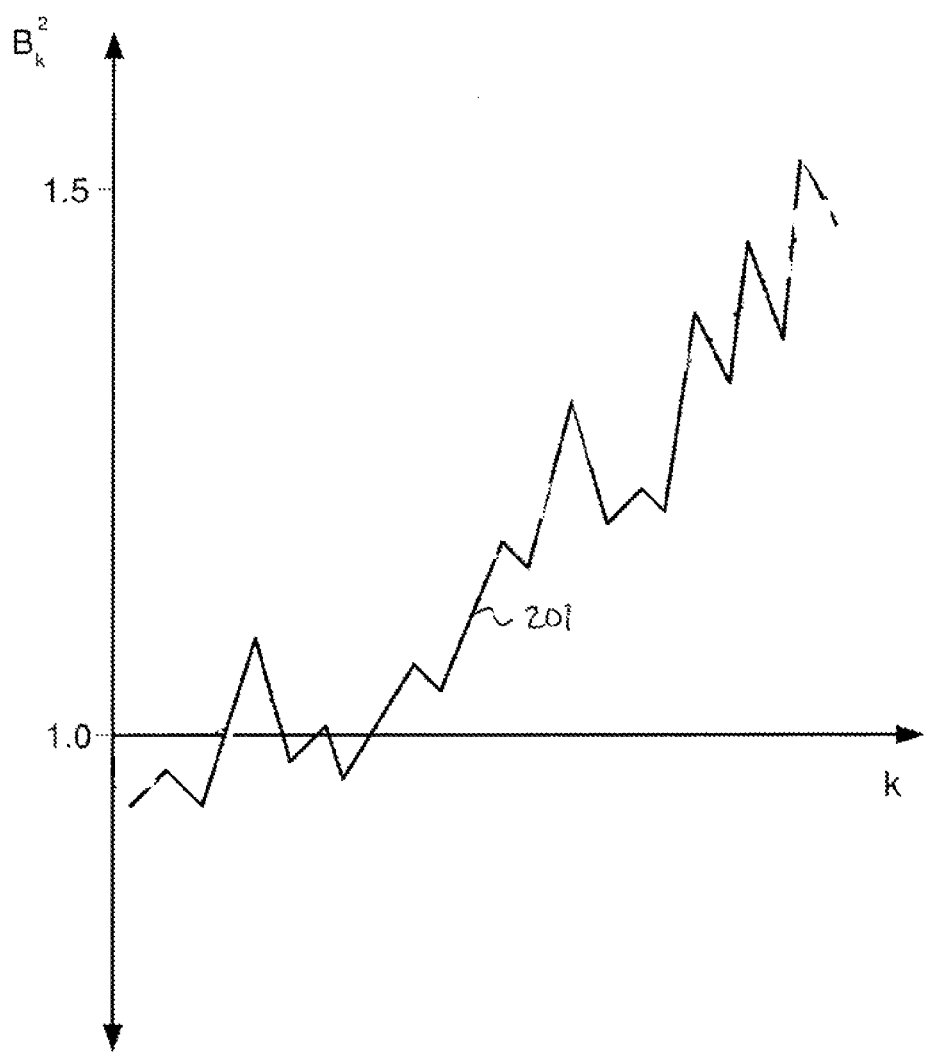
FIG. 2 is a graph illustrating the squared bias ratio in terms of eigenfactor k with a smooth-fit curve representing the scalar adjustment.

The squared bias ratio, for eigenfactor k, may be determined by equation (18):

$$B_k^2 = \frac{1}{T} \sum_t \left(\frac{d_{kt}}{\sigma_{kt}^D}\right)^2 \qquad (18)$$

where $d_{kt}$ is the realized return and $\sigma_{kt}^D$ is the unadjusted predicted volatility of $d_{kt}$. In equation (18), through the summation, equal weight is given to each period. In some embodiments, the weights may be different for various periods, or an exponentially weighted moving average may be used. In any event, the statistic may be noisy, as shown by line 201 in FIG. 2, which illustrates the squared bias ratio in terms of eigenfactor k. By examining the squared bias ratio, the bias in the eigenfactor variance may be estimated. As illustrated, for the first few eigenvalues, the bias ratio may be less than 1 due to the overestimated volatilities.

Instead of using empirical techniques, a pure simulation may be utilized to determine $\lambda_k^2$. Letting F be the unadjusted factor covariance matrix, a Cholesky decomposition may be used to generate a set of simulated daily factor returns $\hat{f}_{kt}^n$, where n denotes the simulation run. The computer system 105 may generate $\hat{F}^n$, the simulated factor covariance matrix, based on the simulated returns. A different simulated factor covariance matrix will be simulated for each run n. Next, the eigenfactor portfolios $\hat{d}_k^n$ for each factor k, run n, may be computed using the computer system 105 and diagonalizing $\hat{F}^n$ and constructing the eigenfactors. The variance of the simulated eigenfactors may be computed using either the simulated factor covariance matrix $\hat{F}^n$ or the unadjusted factor covariance matrix F. Let $\hat{\sigma}_k^n$ be the predicted volatility of eigenfactor $\hat{d}_k^n$ using the simulated matrix $\hat{F}^n$ and $\sigma_k^n$ be the volatility of the same eigenfactor $\hat{d}_k^n$ computed using the unadjusted factor covariance matrix F. The variance of eigenfactor k for run n may be determined by equation (19):

$$(\sigma_k^n)^2 = (\hat{d}_k^n)' F \hat{d}_k^n \qquad (19)$$

Similarly, $\hat{\sigma}_k^n$ is given by equation (20):

$$(\hat{\sigma}_k^n)^2 = (\hat{d}_k^n)' \hat{F}^n \hat{d}_k^n \qquad (20)$$

The adjustment factor $\lambda_k^2$, as determined by a simulation technique, may be calculated from equation (21) by averaging the variance ratio across simulation runs:

$$\lambda_k^2 = \frac{1}{N} \sum_n \left( \frac{\sigma_k^n}{\hat{\sigma}_k^n} \right)^2 \qquad (21)$$

As is to be appreciated, the number of simulations will affect the smoothness of the curve. While equation (21) uses an equal weighting scheme, a non-equal weighting scheme may be used in various implementations. In some embodiments, $\lambda_k^2$ may be based on data from 100 or more simulations, or even 1000 simulations, for example. This disclosure is not intended to be limited to any particular range of simulations.

Figure 3:
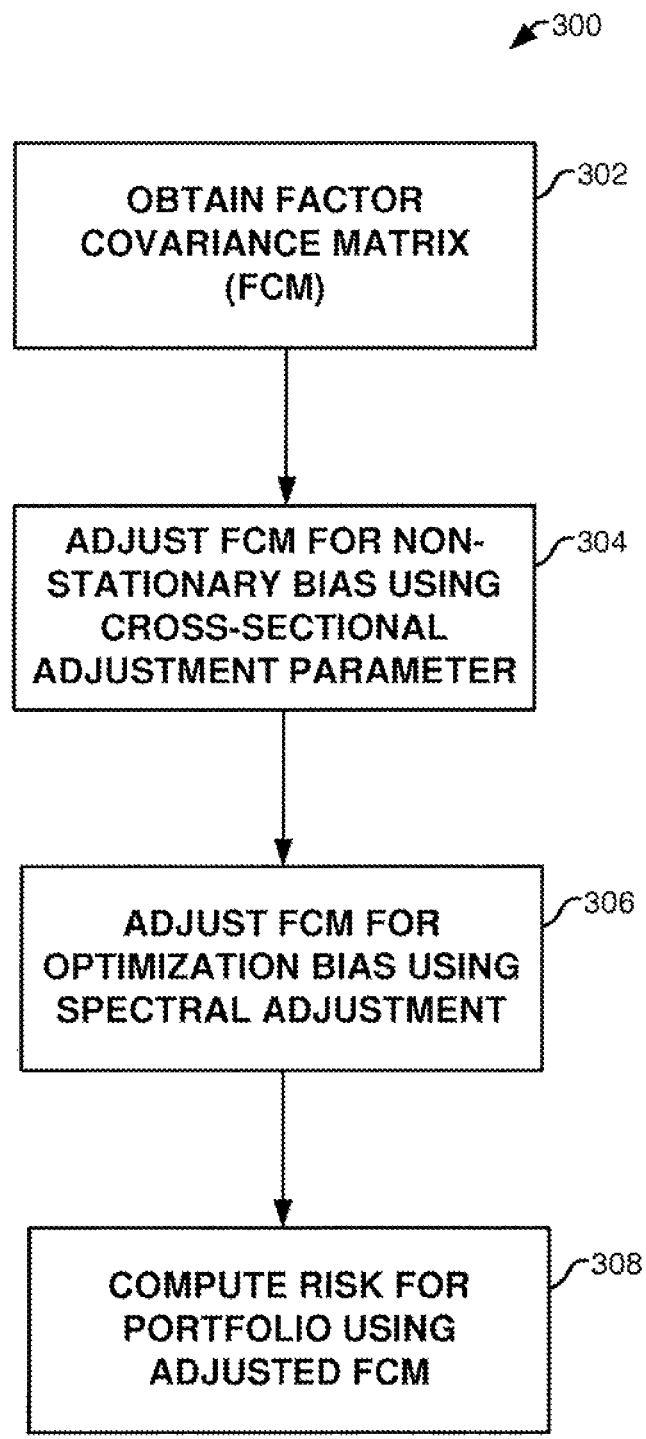
FIG. 3 is flowchart illustrating a process for adjusting a factor covariance matrix in accordance with one non-limiting embodiment.

FIG. 3 illustrates a process 300 for adjusting a factor covariance matrix in accordance with one non-limiting embodiment. In one embodiment, process 300 is implemented by the computer system 105 (e.g., the processor 109) when executing the code of the portfolio risk computation module 100 (FIG. 1). At step 302, an unadjusted FCM is obtained, such as by the process described in the GEM2 Research Notes. At step 304, the FCM is adjusted to account for non-stationarity bias using a cross-sectional adjustment parameter. Next, at step 306, the adjusted FCM from step 304 may be adjusted to account for optimization bias using a spectral adjustment, as described above. Next, at step 308, the risk (or volatility) for the portfolio may be computed using, for example, equation (1) above, and using the adjusted FCM from step 306. As mentioned before, instead of adjusting for both the non-stationarity bias and the optimization bias, in various embodiments, only one of the biases may be adjusted for. That is, step 304 or step 306 may be eliminated. Also, if both biases are adjusted for, the adjustment could be done in reverse order; that is, step 306 may be performed before step 304.

When making risk predictions, they may be made, for example, for a one month risk horizon. Using monthly returns for a covariance matrix has its limitations, since it takes a relatively long time to gather data (e.g., a five year span has only 60 data points). Instead, shorter periods (e.g., daily observations) may be used to gather more data and provide more responsive forecasts. With daily factor returns, however, there may be serial correlation which may skew the data. In some embodiments, the data may be adjusted to account for the serial correlation, which results in a more accurate covariance matrix for a monthly prediction horizon or some other suitable time horizon. A serial correlation adjustment may be determined using a variety of techniques. In one embodiment, the serial correlation adjustment factor is determined by equation (22):

$$c_{kt} = \frac{\sigma_{kt}^0}{\sigma_{kt}} \qquad (22)$$

where $\sigma_{kt}^0$ is the volatility forecast without serial correlation and $\sigma_{kt}$ is the volatility forecast including serial correlation. The serial correlation adjustment factor may be incorporated in equation (2), for example, resulting in equation (23):

$$B_t^2 = \sum_k \omega_{kt} \left( \frac{f_{kt}}{c_{kt} \sigma_{kt}} \right)^2 \qquad (23)$$

Equation (23) then may be used to calculate the EWMA estimate of the cross-sectional squared bias statistic, similar to equation (3), for example. As a result, the cross-sectional volatility adjusted forecast after adjustment for serial correlation may be calculated by equation (24):

$$\tilde{\sigma}_k = B \sigma_k \qquad (24)$$

While several embodiments of the invention have been described, it should be apparent, however, that various modifications, alterations and adaptations to those embodiments may occur to persons skilled in the art with the attainment of some or all of the advantages of the invention. For example, the steps of the processes described above may be performed in different or alternative orders in various embodiments, or certain steps could be combined. It is therefore intended to cover all such modifications, alterations and adaptations without departing from the scope and spirit of the present invention as defined by the appended claims.

In general, it will be apparent to one of ordinary skill in the art that at least some of the embodiments described herein may be implemented in many different embodiments of software, firmware, and/or hardware. The software and firmware code may be executed by a processor or any other similar computing device or system. The software code or specialized control hardware that may be used to implement embodiments is not limiting. For example, embodiments described herein may be implemented in computer software using any suitable computer software language type, using, for example, conventional or object-oriented techniques. Such software may be stored on any type of suitable computer-readable medium or media, such as, for example, a magnetic or optical storage medium. The operation and behavior of the embodiments may be described without specific reference to specific software code or specialized hardware components. The absence of such specific references is feasible, because it is clearly understood that artisans of ordinary skill would be able to design software and control hardware to implement the embodiments based on the present description with no more than reasonable effort and without undue experimentation.

Moreover, the processes associated with the present embodiments may be executed by programmable equipment, such as computers or computer systems and/or processors. Software that may cause programmable equipment to execute processes may be stored in any storage device or systems, such as, for example, a computer system (nonvolatile) memory, an optical disk, magnetic tape, or magnetic disk. Furthermore, at least some of the processes may be programmed when the computer system is manufactured or stored on various types of computer-readable media.

It can also be appreciated that certain process aspects described herein may be performed using instructions stored on a computer-readable medium or media that direct a computer system to perform the process steps. A computer-readable medium may include, for example, memory devices such as diskettes, compact discs (CDs), digital versatile discs (DVDs), optical disk drives, or hard disk drives. A computer-readable medium may also include memory storage that is physical, virtual, permanent, temporary, semipermanent, and/or semitemporary.

A "computer," "computer system," "host," or "processor" may be, for example and without limitation, a processor, microcomputer, minicomputer, server, mainframe, laptop, personal data assistant (PDA), wireless e-mail device, cellular phone, pager, processor, fax machine, scanner, or any other programmable device configured to transmit and/or receive data over a network. Computer systems and computer-based devices disclosed herein may include memory for storing certain software applications used in obtaining, processing, and communicating information. It can be appreciated that such memory may be internal or external with respect to operation of the disclosed embodiments. The memory may also include any means for storing software, including a hard disk, an optical disk, floppy disk, ROM (read only memory), RAM (random access memory), PROM (programmable ROM), EEPROM (electrically erasable PROM) and/or other computer-readable media.

In various embodiments disclosed herein, a single component may be replaced by multiple components and multiple components may be replaced by a single component to perform a given function or functions. Except where such substitution would not be operative, such substitution is within the intended scope of the embodiments. Any servers described herein, for example, may be replaced by a "server farm" or other grouping of networked servers (such as server blades) that are located and configured for cooperative functions. It can be appreciated that a server farm may serve to distribute workload between/among individual components of the farm and may expedite computing processes by harnessing the collective and cooperative power of multiple servers. Such server farms may employ load-balancing software that accomplishes tasks such as, for example, tracking demand for processing power from different machines, prioritizing and scheduling tasks based on network demand and/or providing backup contingency in the event of component failure or reduction in operability.

What is claimed is:

1. A computer-implemented method for modeling risk of an investment portfolio, the method comprising:
   computing, by a computer system, a factor covariance matrix for the investment portfolio, wherein the factor covariance matrix comprises a plurality of elements that are representative of a covariance of factor returns for the investment portfolio for two of a plurality of factors, wherein the plurality of factors are used to model risk of the investment portfolio, and wherein the computer system comprises at least one processor and operatively associated memory;
   adjusting, by the computer system, a diagonal covariance matrix comprising eigenfactors of the factor covariance matrix to generate an adjusted diagonal covariance matrix;
   transforming, by the computer system, the adjusted diagonal covariance matrix to a non-diagonal adjusted factor covariance matrix; and
   computing, by the computer system, a risk for the investment portfolio based on at least the non-diagonal adjusted factor covariance matrix.

2. The method of claim 1, further comprising generating, by the computer system, the diagonal covariance matrix by a matrix multiplication operation involving the factor covariance matrix, a rotation matrix, and a transpose of the rotation matrix.

3. The method of claim 1, wherein adjusting the diagonal covariance matrix comprises applying a scalar adjustment factor to each of a plurality of eigenfactors of the factor covariance matrix.

4. The method of claim 3, wherein applying the scalar adjustment factor to each of the plurality of eigenfactors is based on:

$$\tilde{\sigma}_k^D = \lambda_k \sigma_k^D$$

wherein $\tilde{\sigma}_k^D$ is the adjusted predicted volatility of the return of the eigenfactor k;

wherein $\sigma_k^D$ is the unadjusted predicted volatility of the return of the eigenfactor k; and
wherein $\lambda_k$ is the scalar adjustment factor for the eigenfactor k.

5. The method of claim 3, further comprising calculating the scalar adjustment factor, wherein the calculating comprises for each of the plurality of eigenfactors, calculating a squared bias ratio.

6. The method of claim 5, wherein calculating the squared bias ratio is based on a relation:

$$\text{squared bias ratio} = \frac{1}{T} \sum_t \left(\frac{d_{kt}}{\sigma_{kt}^D}\right)^2$$

wherein k is the eigenfactor;
wherein T is a time period length;
wherein t denotes time periods;
wherein $d_{kt}$ is a return of the eigenfactor k over the period t; and
wherein $\sigma_{kt}^D$ is the unadjusted predicted volatility of $d_{kt}$.

7. The method of claim 6, further comprising calculating the return of the eigenfactor k over the period t based on:

$$d_{kt} = f'_t U'_t e_k$$

where $U'_t$ is a transpose of a unitary matrix;
where $e_k$ is a K×1 vector with zeros in all entries except for a one in the $k^{th}$ element; and
where $f'_t$ is 1×K vector of pure factor returns for time period t.

8. The method of claim 3, further comprising calculating the scalar adjustment factor by simulation.

9. The method of claim 8, wherein the calculating comprises:
   generating a set of simulated daily factor returns for the unadjusted factor covariance matrix over a plurality of simulation runs;
   for each of the plurality of simulation runs:
      generating a simulated factor covariance matrix considering the set of simulated daily factor returns for the simulation run;
      constructing a set of simulated eigenfactors for each simulated factor covariance matrix;
      computing a variance ratio for each of the simulated eigenfactors, wherein the variance ratio is a ratio between (i) a variance of the simulated eigenfactor using the unadjusted factor covariance matrix and (ii) a variance of the same simulated eigenfactor using the simulated factor covariance matrix; and
   for each eigenfactor of the factor covariance matrix, average the variance ratio associated with the eigenfactor across the plurality of simulation runs.

10. The method of claim 1, wherein transforming the adjusted diagonal covariance matrix to the non-diagonal adjusted factor covariance matrix comprises a matrix multiplication operation involving the diagonal covariance matrix, a rotation matrix, and a transpose of the rotation matrix.

11. The method of claim 1, wherein transforming the adjusted diagonal covariance matrix to an adjusted non-diagonal factor covariance matrix comprises transforming the adjusted diagonal covariance matrix to an original basis.

12. The method of claim 1, wherein the factor covariance matrix for the investment portfolio is a factor correlation matrix.

13. A computer-implemented system for modeling risk of an investment portfolio, the system comprising:

a computer system comprising at least one processor and operatively associated memory, the computer system programmed to:
compute a factor covariance matrix for the investment portfolio, wherein the factor covariance matrix comprises a plurality of elements that are representative of a covariance of factor returns for the investment portfolio for two of a plurality of factors, and wherein the plurality of factors are used to model risk of the investment portfolio;
adjust a diagonal covariance matrix comprising eigenfactors of the factor covariance matrix to generate an adjusted diagonal covariance matrix;
transform the adjusted diagonal covariance matrix to a non-diagonal adjusted factor covariance matrix; and
compute a risk for the investment portfolio based on at least the non-diagonal adjusted factor covariance matrix.

* * * * *